United States Patent
Agrawal et al.

(10) Patent No.: US 10,755,321 B1
(45) Date of Patent: Aug. 25, 2020

(54) TECHNIQUES FOR DYNAMIC UTILIZATION OF ADVERTISING CAPABILITIES BY APPLICATIONS ON USER DEVICES

(71) Applicant: A9.com, Inc., Palo Alto, CA (US)

(72) Inventors: Aneesh Agrawal, Cambridge, MA (US); Michael Helman, Sunnyvale, CA (US); Zhihui Xiao, Palo Alto, CA (US); Pratyush Mishra, Berkeley, CA (US); Wei Zhuang, Palo Alto, CA (US)

(73) Assignee: A9.COM, INC., Palo Alto, CA (US)

( * ) Notice: Subject to any disclaimer, the term of this patent is extended or adjusted under 35 U.S.C. 154(b) by 825 days.

(21) Appl. No.: 14/568,989

(22) Filed: Dec. 12, 2014

(51) Int. Cl.
*G06Q 30/02* (2012.01)
(52) U.S. Cl.
CPC ................ *G06Q 30/0277* (2013.01)
(58) Field of Classification Search
CPC .................................... G06Q 30/0277
USPC .................... 705/14.58, 1.1, 14.73
See application file for complete search history.

(56) References Cited

U.S. PATENT DOCUMENTS

2008/0221909 A1* 9/2008 Muhonen .............. G06Q 30/02
705/1.1
2012/0316963 A1* 12/2012 Moshfeghi ............ G06Q 20/20
705/14.58
2013/0166397 A1* 6/2013 Byun ................. G06Q 30/0277
705/14.73

FOREIGN PATENT DOCUMENTS

WO    WO-2004102459 A1 * 11/2004 ............. G06F 21/10

OTHER PUBLICATIONS

Julia Angwin and Jeff Larson, Somebody's Already Using Verizon's ID to Track Users, 2014 (Year: 2014).*

* cited by examiner

*Primary Examiner* — Tarek Elchanti
(74) *Attorney, Agent, or Firm* — Eversheds Sutherland (US) LLP

(57) ABSTRACT

Certain embodiments herein relate to dynamically updating a software application to utilize new advertising capabilities or features at runtime. A software application may be developed using libraries in a software development kit (SDK) that include particular functionality related to advertising. As new ad related features become available (such as displaying or handling new ad types or tracking new metrics associated with ads), the new features may be injected or loaded into the application at runtime. Such loading may configure a device running the application to take advantage of the new ad features without re-downloading, reinstalling, or performing other initialization functions associated with the application and/or its library functions.

17 Claims, 5 Drawing Sheets

US 10,755,321 B1

TECHNIQUES FOR DYNAMIC UTILIZATION OF ADVERTISING CAPABILITIES BY APPLICATIONS ON USER DEVICES

BACKGROUND

Developers of software applications may utilize software development kits (SDKs) when developing their applications. The SDKs may include program code that makes available certain features or functions to the applications, and ultimately, to the end users who use the applications. Unfortunately, new features or updates to the SDKs may require time-consuming processes, such as a developer modifying the application to incorporate the new features and publishing the application, as well as end users subsequently downloading and installing the published application. The availability of new features that may benefit users and developers, among others, may therefore be hindered.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items, however, various embodiments may utilize elements and/or components other than those illustrated in the figures.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein relate to, among other things, dynamically updating a software application to utilize new advertising capabilities or features at runtime. A software application may be developed using libraries in a software development kit (SDK) that include particular functionality related to advertising. For example, an application that includes such libraries may configure a device to display ads according to certain ad types or track certain information associated with the ads, among other features. In certain embodiments herein, as new ad related features become available, the new features may be injected or loaded into the application at runtime. Such loading configures a device running the application to take advantage of the new features without re-downloading, reinstalling, or performing other initialization functions associated with the application and/or its library functions. For example, the device, by virtue of injecting new ad features, may be configured to display additional ad types and/or track additional metrics, among other features, that were not available prior to publication of the new features.

In one example, a user device that is dynamically configured to display new ad types may send a request for an ad to an ad server, and may indicate in the request one or more types of ads that the device is capable of handling. The ad server may send the requested ad to the user device in a format, or otherwise according to, the requested ad types. The user device may thereafter implement a library function corresponding to the new ad type features to display the ad according to the received ad types. New features associated with tracking ad metrics may be implemented in similar fashion, among other features.

The above descriptions are for purposes of illustration and are not meant to be limiting. Numerous other descriptions and examples exist, some of which are described below.

Figure 1:
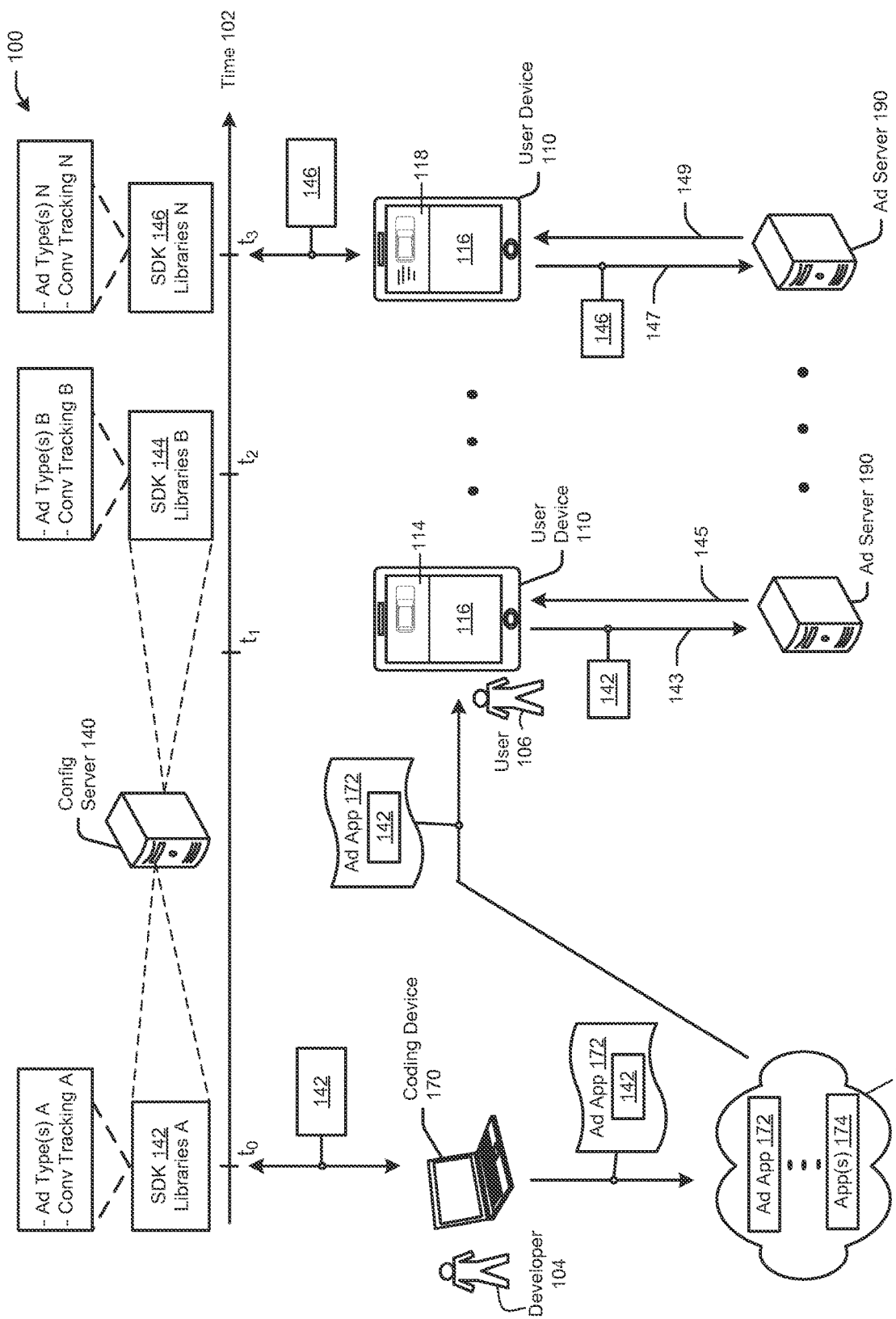
FIG. 1 illustrates a schematic diagram of a process for dynamic utilization of advertising capabilities by an application, according to an embodiment of the disclosure.

FIG. 1 depicts a schematic diagram of a process 100 for dynamic utilization of advertising capabilities by an application, according to an embodiment of the disclosure. The process 100 may be implemented or facilitated by a user device 110, a configuration server 140, a coding device 170, and an ad server 190, in one embodiment. Although only one of each of these devices is shown, more may exist in other embodiments.

The configuration server 140, or other device, may store features or capabilities associated with advertising, mobile advertising, or various other purposes. In one embodiment, such features may be associated with a software development kit (SDK) 142, which may include libraries that may extend functionality to various programming languages used to develop an application, such as the application 172 developed by a developer 104 utilizing a coding device 170. In certain embodiments herein, the extended functionality may relate to advertising products or services to users. Such functionality may enable the user device 110 to display various ad types or track information associated with an ad, as will be described in greater detail below.

Certain embodiments herein relate to making such functionality or features (such as a capability to display new ad types or track new information) available to the user device 110 as the features become available. As shown in FIG. 1, the features may become available over time, as indicated by the progression of time in the direction of the time arrow 102. The new features may be utilized by the user device 110 dynamically, for example, without the developer 104 re-downloading an SDK that includes the new features, updating the application 172 to include the new features, and republishing the application 172 to a location (e.g., the cloud storage 180) where the user 106 of the user device 110 may access, re-download, and reinstall the application to gain access to the new features. Put another way, such repetitive processes by the developer 104 and the user 106 may be avoided by dynamic utilization of advertising capabilities as described herein.

As shown in FIG. 1, an SDK 142 may include various advertisement (ad) types and information tracking mechanisms. Example ad types may include various formats in which ads may be displayed such as, but not limited to, banner ads and interstitial ads. Banner ads may refer to advertisements on at least a portion of a web page that, when selected, perform various functions such as redirecting the user device 110 to an advertising website associated with a product or service displayed in the advertisement. Interstitial ads may refer to advertisements on at least a portion of a web page (e.g., the entire web page) that are shown between a transition from first content on a web page to second content on the web page. Other types of ad formats may exist in other examples.

Either of the banner ads or interstitial ads may be video ads or static ads, both of which may also be ad types in certain embodiments herein. Another example ad type may include a native ad type, which may have a look and feel of a web page associated with the publisher of the web content. Put another way, certain attributes (e.g., text, fonts, colors, backgrounds, etc.) on a web page may be shared by an ad (e.g., a native ad) such that the ad appears to be integrated with or otherwise related to the web page. Another example ad type may include download ads, which when selected, may perform various functions, such as downloading information (e.g., an application) to the user device 110 or other device.

In other examples, an ad type may refer generally to any function that may be performed in association with selecting an ad, displaying an ad, interacting with the ad, etc. The functions that may be performed in such instances may include any number of actions such as, but not limited to, playing a video, adding identifying information associated with a merchant of an advertised product to a shopping cart, providing various information (e.g., associated with a product, merchant, etc.) to the user device 110 accessing the ad, and tracking various information associated with a user's actions with respect to the ad.

In one embodiment, Conversion Tracking A may refer to conversion tracking information that may be collected by a user device 110 that interacts with an ad. The SDK 142 libraries may include functionality that may enable a user device 110 to track certain information about the user device's 110 interaction with the ad. For example, information associated with a user device's 110 selection (e.g., click) of an ad, downloading the ad, installing the ad, etc., may be tracked. Example information may include the time at which such actions were performed and the identities of the user device 110 and/or the user who performed the actions, as well as information identifying the ad, publisher of the ad, merchant of a product or service advertised in the ad, or other information that may be shared, stored, or otherwise available on a network that communicatively links the devices in FIG. 1 together.

As described above, an SDK may be updated over time to include new features, such as capabilities for handling new or different ad types and tracking new information associated with an ad. As shown in FIG. 1, the SDK 142 libraries stored at the configuration server 140 may initially include an Ad Type A and Conversion Tracking A. The SDK 142 libraries in the present example may be referred to a standard or base level SDK in the way that it may include basic features that were available at the time of initial installation by the coding device 170 but may be void of new features that have become available thereafter, as will be described in greater detail below. The application 172 may therefore include the basic features (e.g., Ad Type A and Conversion Tracking A) made available via the SDK 142 libraries. In some embodiments, the standard or base level features in the SDK 142 libraries may not include any ad types, conversion tracking functionality, or certain other features, but may instead include functionality associated with obtaining these features. Put another way, initial SDK 142 libraries may include only a mechanism to request and load new features on the user device 110, after which the user device 110 may be configured to handle certain ad types, track certain conversion tracking metrics, and/or perform any number or type of new features.

In one embodiment, the base level or initial functions in the SDK 142 libraries may generate a second library that includes the initial libraries and one or more additional libraries. In this way, the initial libraries may inject, add, or bring in new functionality into one or more second libraries that may configure a device to perform the functions in the initial libraries and the one or more additional libraries, in certain embodiments herein.

As described above, the developer 104 may utilize the coding device 170 to download, install, and use the SDK 142 libraries to develop the application 172. In one embodiment, the application 172 may be an application that enables the user device 110 to present ads of certain types (e.g., as denoted by the Ad Type A) and track certain information associated with the ad (e.g., as denoted by Conversion Tracking A). The generated application 172 may be published or otherwise made available at various network-accessible locations, such as the cloud storage 180, from which the user device 110 may access (e.g., download) the application 172, as well as various other applications 174.

The user device 110 may communicate with an ad server 190 to request an ad via the application 172. Such a request is shown in FIG. 1 as message 143. As part of the request, the user device 110 may send an indication to the ad server that the user device 110 is capable of displaying ads of Ad Type A. Such a capability may be available by virtue of the user device 110 executing the application 172, which leverages the Ad Type A and Conversion Tracking A features of the SDK 142 libraries, as described above. The ad server 190 may send the requested ad in a response message 145. The ad sent from the ad server 190 may be configured or formatted for display consistent with the Ad Type A, in one embodiment. For example, if Ad Type A indicates a banner ad in the message 143, then the ad server 190 may send the requested ad formatted as a banner ad to the user device 110 in the message 145. An example banner ad 114 is shown at the upper portion of the web page content 116 in FIG. 1.

In the present example, the banner ad 114 may include a static image of an automobile as shown. Upon dynamically loading new features, the user device 110 may be configured to display a video of the automobile as shown at time $t_3$. In other examples, the newly loaded features may configure the user device 110 to perform any number of functions that were not previously available, such as redirecting the user device 110 to a different website, launching a new application on the user device 110, retrieving a video to play, or performing other levels of features upon selecting the banner ad 114.

As new features become available over time 102, the new features may be incorporated into one or more libraries of a subsequent SDK, such as the SDK 144 libraries. In one embodiment, the SDK 144 libraries may include the same features as the SDK 142 libraries but may also include new features or functionality that became available after the coding device 170 downloaded the SDK 142 libraries. As an example, Ad Type B associated with the SDK 144 libraries may enable banner ads to be displayed as video ads, prior to which only static ads may have been available, for example, via the SDK 142 libraries. Conversion Tracking B may also be available in the SDK 144 libraries. Conversion Tracking B may configure the user device to track information associated with the time of day that an ad was selected by the user device 110. Prior to availability of the SDK 144 libraries, the time of day that an ad was selected may not have been available for tracking, for example, via the SDK 142 libraries.

Continuing the above example, the SDK 146 libraries may be generated to include Ad Type N and Conversion Tracking N, both of which may include one or more new features (e.g., in addition to features in the SDK libraries 142 and 144) associated with ads that were not previously available. As an example, the Ad Type N may enable the user device 110 to display banner ads as static images or videos, as well as interstitial ads that are static or video. Displaying such interstitial ads by the user device 110 may have been unavailable prior to the user device 110 downloading and installing the SDK 146 libraries, in the present example. As another example, Conversion Tracking N may configure the user device 110 to track an amount of time that elapsed from installation of the application 172 to selection of an ad. Other information that may be tracked, whether as part of Conversion Tracking A, B, or N, may include, but is not limited to, the time of day that a user downloaded and installed the application 172.

As shown in FIG. 1, the user device 110 may download and install the SDK 146 libraries to access features associated with the Ad Type N and Conversion Tracking N. As an example, the user device 110 may request an ad via the application 172 as a message 147 sent to the ad server 190. The request may include an indication that the user device 110 (e.g., via the new features Ad Type N available to the application 172) is capable of displaying video banner ads. The ad server 190 may respond by sending a message 149 that includes the requested ad configured or formatted for display as a video banner ad, such as the banner ad 118. Multiple lines are shown behind the automobile to indicate that the banner ad 118 includes a video of the automobile, which is an enhancement to the static image of the automobile in the banner ad 114. Other enhancements to an existing ad type (e.g., upgrading from a static image to a video as described above) or enhancements that transition a user device's 110 capability from displaying one ad type to include another type (e.g., transitioning from a banner ad type to include an interstitial ad type as well as the banner ad type), among other examples, may also exist.

In the manner described above, new advertising features may be utilized by the user device 110 without the user device 110 dynamically, for example, without reinstalling the application 172 after the functions corresponding to the new features in the SDK 146 libraries have been incorporated into the application 172 by the developer 104 using the coding device 170.

As shown in FIG. 1, the user device 110 does not again access the cloud storage 180 to re-download the application 172 after the features in the SDK 146 libraries become available. The user device 110 instead communicates with the configuration server 140 to receive the new features, and may subsequently inject or load program code corresponding to the new features into the application 172 using the base functionality of the SDK 142 libraries to utilize the new features. Processes associated with enabling the user device 110 to perform such functions will be described in greater detail below.

In one embodiment, the user device 110 may not receive the SDK 144 libraries (which may include the same features in the SDK 142 libraries in addition to new features) when it becomes available at time $t_2$, as shown. For example, the user device 110 may be powered down or may not have received an indication of one or more triggers that may cause the user device 110 to request new features from the configuration server 140. Example triggers may include, but are not limited to, starting or launching the application 172, requesting an ad from the ad server 190, or arrival of a time of day or periodic interval of time.

In the present example, the user device 110 may communicate with the configuration server 140 at time $t_1$ to request new features. The configuration server 140 may not identify any new features (other than those features downloaded at time $t_0$) at time $t_1$. The user device may be powered down when time $t_2$ arrives, which is the time at which features associated with the SDK 144 libraries become available. Upon being powered up at time $t_3$, the user device 110 may communicate with the ad server 190 to request new features, as shown. As another example, the user device 110 may receive an indication from the user 106 to request an ad (e.g., from the ad server 190), which may also trigger the user device 110 to request new features from the configuration server 140, also as shown.

After receiving a request for new features at time $t_3$, the configuration server 140 may provide a message to the user device 110 indicating that new features associated with the SDK 144 libraries and the SDK 146 libraries (available at time $t_3$) are available. The user device 110 may inject features associated with the SDK 146 libraries and/or features associated with the SDK 144 libraries at time $t_3$ in various examples. Which features are injected by the user device 110 may depend on a particular version of an operating system of the user device 110, a version of the application 172, the identity of the user 106, or various other criteria that may be used by the configuration server 140 to determine which features the user device 110 is capable of using or authorized to use, among other considerations. Such functionality will be described in greater detail below.

The above descriptions and examples in FIG. 1 are for purposes of illustration and are not meant to be limiting. Numerous other descriptions and examples may exist in other embodiments. For example, fewer or more ad types, tracking mechanisms, and devices (whether on the same or different networks), may exist. Further, the features and functions described in association with SDKs may exist in other forms, techniques, encapsulation methods, or sources other than an SDK. For example, each feature may be made available independent of an SDK in some embodiments.

Figure 2:
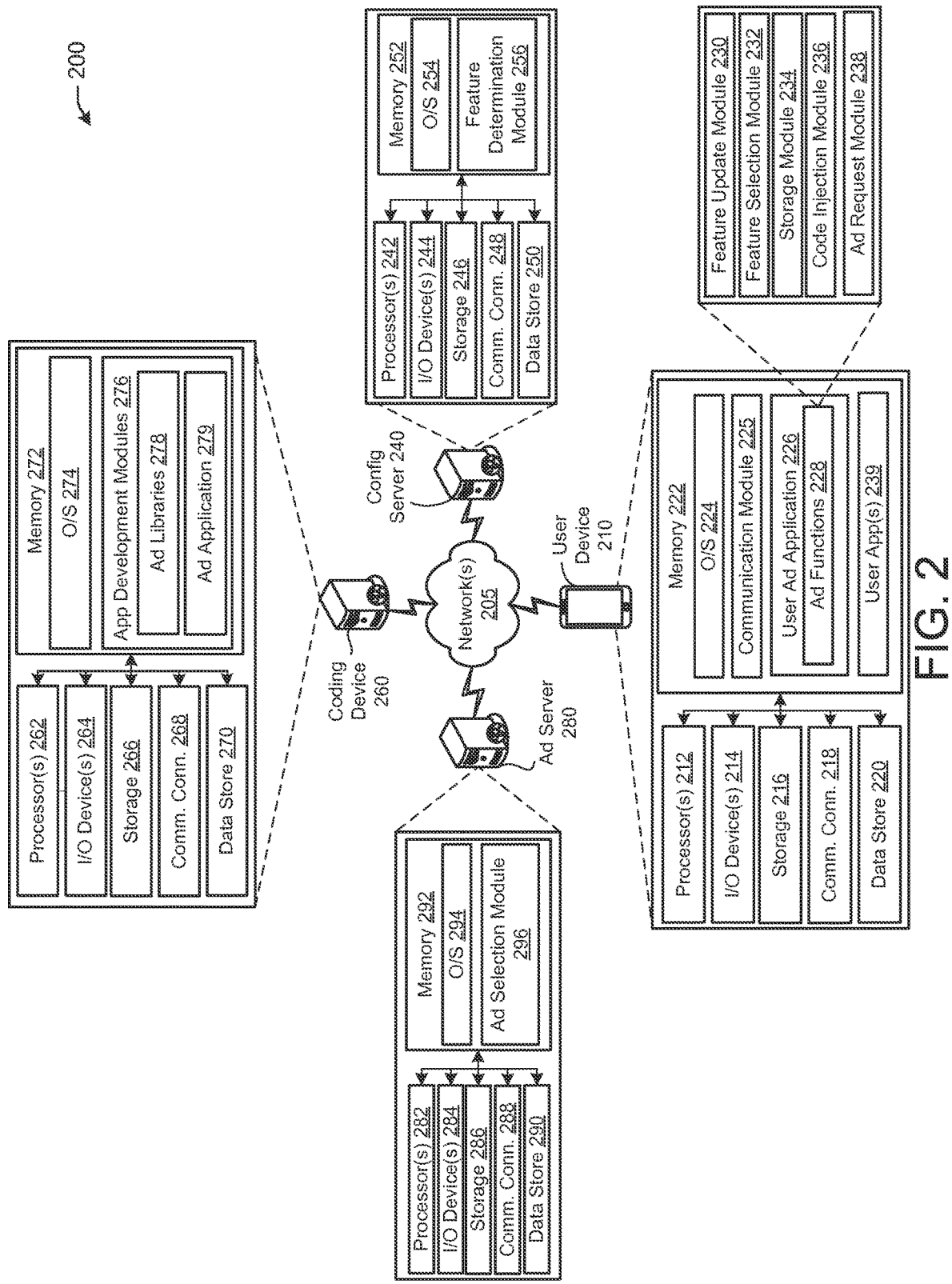
FIG. 2 illustrates an example computing environment for implementing dynamic utilization of advertising capabilities by an application, according to an embodiment of the disclosure.

FIG. 2 depicts an example computing environment 200 for implementing dynamic utilization of advertising capabilities by an application, according to an embodiment of the disclosure. The example computing environment 200 may include, but is not limited to, a user device 210, a configuration server 240, a coding device 260, and an ad server 280. Such devices may communicate with each other over one or more networks 205. For example, the user device 210 may communicate with the configuration server 240 to receive capabilities, features, or information associated with using ads on the user device 210. The user device 210 may also communicate with an ad server 280 to receive ads and information associated with the ads. The coding device 260 may communicate with the configuration server 240 to receive SDKs that may be used to develop applications that may implement the features included in the SDK. The user device 210 may download such applications (e.g., from one or more storage devices (not shown) on the networks 205) and use them to facilitate communication with the ad server 280, among other devices. Other examples of communication between the devices in FIG. 2 may exist.

Certain embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program may be configured to access, including signals downloaded through the Internet or other networks. For example, the distribution of software may be downloaded via the Internet.

The one or more networks 205 may include any number of wired or wireless networks that can enable various computing devices in the example computing environment 200 to communicate with one another. In other embodiments, other networks, intranets, or combinations of different types of networks may be used including, but not limited to, the Internet, intranets, cable networks, cellular networks, wireless networks, landline-based networks, or other communication mediums connecting multiple computing devices to one another. Other embodiments may not involve a network and may provide, for example, features on a single device or on devices that are directly connected to one another.

As used herein, the term "device" may refer to any computing component that includes one or more processors that can be configured to execute computer-readable, computer-implemented, or computer-executable instructions. Example devices can include personal computers, server computers, server farms, digital assistants, smart phones, personal digital assistants, digital tablets, wearable devices or computers, Internet appliances, application-specific circuits, microcontrollers, minicomputers, transceivers, or customer premise equipment such as set-top boxes, kiosks, or other processor-based devices. The execution of suitable computer-implemented instructions by one or more processors associated with various devices may form special purpose computers or other particular machines that may implement or facilitate dynamic utilization of advertising capabilities or features by an application on the user device 210, as described herein.

The devices in FIG. 2 may include one or more processors configured to communicate with one or more memory devices and various other components or devices. For example, the user device 210 may include one or more processors 212 that are configured to communicate with one or more memory or memory devices 222, one or more input/output (I/O) devices 214, storage 216, one or more communication connections 218, and one or more data stores 220. The processor 212 may be implemented as appropriate in hardware, software, firmware, or a combination thereof. The processors 242, 262, and 282 associated with the configuration server 240, the coding device 260, and the ad server 280, respectively, may be the same or at least similar to the processor 212.

The memory 222 of the user device 210 may store program instructions that are loadable and executable on the processor 212, as well as data generated during the execution of these programs. Depending on the configuration and type of user device 210, the memory 222 may be volatile, such as random access memory (RAM), and/or non-volatile, such as read-only memory (ROM), flash memory, etc. The memory 252, 272, and 292 associated with the configuration server 240, the coding device 260, and the ad server 280, respectively, may be the same or at least similar to the memory 222.

The storage 216 of the user device 210 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The storage 246, 266, and 286 associated with the configuration server 240, the coding device 260, and the ad server 280, respectively, may be the same or at least similar to the storage 216.

The memory 222 and the storage 216, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data. In some implementations, the memory 222 may include multiple different types of memory, such as static random access memory (SRAM), dynamic random access memory (DRAM), or ROM.

The one or more communication connections 218 may allow the user device 210 to communicate with other devices, such as the configuration server 240, the ad server 280, one or more storage devices such as devices that may be used in the cloud storage 180 in FIG. 1, and various other devices that may exist on the networks 205. In one embodiment, the communication connections 248, 268, and 288 associated with the configuration server 240, the coding device 260, and the ad server 280, respectively, may be the same or at least similar to the communication connections 218.

The I/O devices 214 may enable a user to interact with the user device 210. Such I/O devices 214 may include, but are not limited to, a keyboard, a mouse, a pen, a voice input device, a touch input device, a gesture capture or detection device, a display, a camera or imaging device, speakers, or a printer. The I/O devices 244, 264, and 284 associated with the configuration server 240, the coding device 260, and the ad server 280, respectively, may be the same or at least similar to the I/O devices 214.

The data stores 220 may store lists, arrays, databases, flat files, etc. In some implementations, the data stores 220 may be stored in memory external to the user device 210 but may be accessible via the one or more networks 205, such as with a cloud storage service. The data stores 220 may store information that may facilitate dynamic utilization of advertising capabilities by an application on a user device, as described herein. In some embodiments, all or at least a portion of such information may be stored in the data stores 220, while at least another portion of the information may be stored in one or more databases or other storage mechanisms, whether local or remote from the user device 210. The data stores 250, 270, and 290 associated with the configuration server 240, the coding device 260, and the ad server 280, respectively, may be the same or at least similar to the data stores 220.

The stored information may include, but is not limited to, information identifying software on the user device, such as the operating system 224 and one or more user applications 226. Such information may include an identification and current version of the operating system 224 and the user applications 226. Identifying information of a user of the user device 210 may also be stored, such as a unique identification of the user, authentication credentials such as a login name for accessing remote devices. The stored information may also include an identification of a location within a file system, or other storage allocation, in which an identified SDK or library function (e.g., feature) of the SDK is stored.

The stored information may further include various metrics or data associated with tracking actions associated with ads. Such information may include the time of day that a user selected an ad, received the ad after the selection, downloaded an application (e.g., the application 172 in FIG. 1) that uses the ad, and installed the application that uses the ad, among other information associated with any number of actions performed in association with an ad, using or interacting with the ad, etc.

Turning to the contents of the memory 222, the memory 222 may include an operating system 224 and various software applications and/or modules that may implement or facilitate the processes described herein. Example modules may include, but are not limited to, a communication module 225; an ad application 226, which may include ad functions 228; and one or more other user applications 239. Each of these modules may be implemented as individual modules that provide specific functionality associated with dynamic utilization of advertising capabilities by an application on the user device 210. Alternatively, one or more of the modules may perform all or at least some of the functionality associated with the other modules.

The operating system 224 may refer to a collection of software that manages computer hardware resources and provides common services for computer programs to enable and facilitate operation of such programs. Example operating systems may include Android, other mobile device operating systems, UNIX, Microsoft Windows, Apple OS X, Mac OS, Linux, Solaris, etc. The operating systems 254, 274, and 294 associated with the configuration server 240, the coding device 260, and the ad server 280 may include at least one of the above example operating systems.

The communication module 225 may configure the user device 210 to communicate with the other devices shown in FIG. 2, as described above. A more detailed description of such communication is provided in association with FIG. 3. The communication module 225 may implement various communication protocols to enable communication with the devices in FIG. 2. Example protocols may include Hypertext Transfer Protocol (HTTP), Transmission Control Protocol/Internet Protocol (TCP/IP), socket-based protocols such as the WebSocket protocol, or other message formats and/or rules for exchanging information between computing devices to support communication between web-based program code and client-server-based program code, as examples. Additional protocols may include Simple Mail Transfer Protocol (SMTP) or other electronic mail formats for transmitting messages via electronic mail or text messaging using one or more text formats. The configuration server 240, the coding device 260, and the ad server 280 may include a similar communication module (not shown) that configures these devices to communicate with other devices on the one or more networks 205.

The ad application 226 may perform various functions associated with ads, such as presenting the ads, enabling users to interact with the ads, or any number or type of functions related to advertising. The ad application 226 may be embodied by the ad application 172 in FIG. 1, in one example. Other embodiments may include applications that are related to various other functions or purposes, such as A/B testing, purchasing, web services, analytics, etc. These applications are not meant to be excluded from the processes described herein.

The ad functions 228 may configure the user device 210 to perform particular functions associated with ads. Such functions may include presenting the ads, tracking user actions associated with the ads, or any number or type of other ad related functions. In one embodiment, the ad functions 228 may correspond to the ad libraries 278 used by the coding device 260 to develop the ad application, or as another example, any of the SDK libraries 142, 144, or 146 in FIG. 1. Put another way, the functions in the ad libraries 278 (e.g., the ad functions 228) may be called as functions from the ad application 226 to utilize the features in the ad libraries 278. The ad libraries 278 may therefore make available certain capabilities or features associated with advertising to the ad application 226.

In certain embodiments herein, the ad functions 228 may include various program modules that may configure the user device 210 to dynamically access and utilize advertising capabilities. Example modules may include, but are not limited to, a feature update module 230, a feature selection module 232, a storage module 234, a code injection module 236, and an ad request module 238.

The feature update module 230 may determine whether new features associated with the ad libraries 278 are available. As used herein, a new feature may refer to functionality that became available after the user device 210 received and installed earlier functionality, as described in association with FIG. 1. In one embodiment, the feature update module 230 may determine whether new features exist by sending a request for such features to the configuration server 240. The feature update module 230 may access a particular server (e.g., using a TCP/IP address of the server or other identifying information) and/or a location (e.g., a particular file system location, database, or other location associated with storage of new features) on the server to request the new features, in one embodiment.

In one example, the feature update module 230 may determine whether new features exist by analyzing information received from the configuration server 240. According to this example, the configuration server 240 may send a message in response to receiving a request from the feature update module 230 for new features. The response message may include, among other information, one or more libraries corresponding to the new features and configuration information to facilitate installation of the new features by the existing ad libraries on the user device 210, as will be described in greater detail below.

In another example, the feature update module 230 may identify one or more new features in a particular location at the configuration server 240. In so doing, the feature update module 230 may invoke the feature selection module 232, which may compare information associated with existing libraries in the ad libraries 278 with information associated with libraries stored at the configuration server 240. If the feature selection module 232 detects a difference between the libraries (e.g., based on a version number or other identifying information for the libraries), then the feature selection module 232 may download the more recent libraries. For example, libraries having a higher or more recent version number than corresponding libraries in the ad libraries 278 stored on the user device 210 may be downloaded and installed.

In one embodiment, the feature selection module 232 may provide a prompt to select one or more features to install on the user device 210. For example, the response message from the configuration server 240 may cause the feature selection module 232 to display a list and a corresponding description of available features, and receive a selection of at least a portion of the features for installation. In this way, the user of the user device 210 may view available features and select, based at least in part on an identifying description of the features, whether to incorporate such features in the ad application 226.

In certain embodiments herein, the feature update module 230 may be invoked according to various triggers, as described above. One such trigger may include launching or executing the ad application 226 by processor 212 of the user device 210. After such launching, the ad application 226 may call the feature update module (function) 230, which may perform the functionality described above. As another example, the feature update module 230 may be invoked in association with requesting an ad (e.g., via the ad request module 238) from the ad server 280. In such instances, the ad request module 238 may invoke the feature update module prior to, concurrently, or after receiving an indication at the user device 210 that the user ad application 226 has requested an ad from the ad server, as non-limiting examples. In other examples, a user's selection of an ad in a web browser (e.g., a web browser that includes a web page rendered by or associated with the ad application 226) may serve as an indication of an ad selection that may cause invocation of the feature update module 230 and a subsequent request for new library functionality as described above. Other triggers that may cause the feature update module 230 to determine whether new features are available exist in other examples.

The storage module 234 may store libraries corresponding to the new features on the user device 210. In one embodiment, the libraries may be stored in a location where they may be accessed by a code injection module 236, which as described below, may inject or load the libraries to enable access to the functions provided by the libraries at runtime of the user device 210. Example locations for storing the libraries may include a file system directory, a memory, other storage areas, etc. In one embodiment, the storage module 234 may store the libraries in accordance with configuration information received from the configuration server 240. As described above, the configuration information may indicate a particular storage area for storing the libraries to facilitate dynamic code injection or loading, in one embodiment.

In some embodiments, the libraries may be stored as a complete overwrite of existing libraries. For example, a new SDK may replace a previously downloaded SDK. The overwritten libraries in the SDK may include the functionality of the previous, overwritten libraries, as well as new functionality. In other embodiments, new libraries may be downloaded and stored for code injection. According to these embodiments, new functionality may be added to existing functionality without overwriting existing functionality as stored in one or more libraries associated with an SDK or other mechanism.

The code injection module 236 may inject or load functionality into an application, such as the ad application 226. As used herein, code injection may refer to the process of dynamically loading a library or other code (e.g., binary code) into memory, retrieving the addresses of functions and variables included in the library, and executing or accessing such functions and variables. By utilizing the code injection module 236, the ad application 226 may begin its processes without access to certain libraries, but may subsequently identify these libraries (e.g., new functionality or features as used herein) and execute their functions at runtime. Put another way, code injection of loading may add functionality to the ad application 226 (or other application that includes the ad libraries 278) without re-downloading or reinstallation of the ad application 226 to use the new functionality, or without interrupting existing or live processes of the ad application 226.

Various operating systems and/or programming languages may be used to implement or facilitate code injection. Example operating systems may include the operating system 224, in one embodiment. Example programming languages may include, but are not limited to, Java, C++, C#, C, Perl, JavaScript, Visual Basic, Python, UNIX shell, various other procedural or object-oriented programming languages, Extensible Markup Language (XML), Hypertext Markup Language (HTML), other markup languages, etc.

The code injection module 236 may perform various functions associated with injecting or loading new functionality or features in the ad application 226 at runtime. For example, the code injection module 236 may identify the new features (e.g., as stored in one or more libraries) on the user device 210 or another network-accessible device on which the new functionality may be stored. The code injection module 236 may be configured to search particular locations for the features, such as in a particular file system directory, memory, etc., as described above.

The code injection module 236 may also load the new features such that they may be used by the ad application 226. In one embodiment, loading the new features may include updating the ad libraries 278 to include one or more new libraries that correspond to the new features. One or more configuration files that may control actions of the ad application 226 may also be updated. In one embodiment, an existing module of the ad application 226 (e.g., the ad request module 238) may determine that a new ad type is available and request that the ad server provide an ad according to the new ad type. Upon receiving the ad according to the new ad type, the new library or code injected into the ad application 226 may display the ad according to the new ad type.

In one embodiment, the code injection module 236 may modify existing program code to include new program code corresponding to new features as part of injecting a new feature at runtime. In so doing, the code injection module 236 may access the new code at a particular location, as described above, and may update a library or module that includes related functionality or that is associated with the new feature. For example, the feature update module 230 may be updated with program code that configures it to access a file system that include features stored for the user device 210 prior to accessing a shared directory for new features. In this way, any number or type of features may be dynamically injected into program code to leverage new functionality or features at runtime.

In one embodiment, the storage module 234 may invoke the code injection module 236 upon storing the features. In another embodiment, the code injection module 236 may periodically search for new features in particular locations, and upon identifying the new features, may inject the features into the ad application 226.

The ad functions 228 may also include an ad request module 238. The ad request module 238 may request one or more ads from a device, such as the ad server 280. The request may include information identifying the user device 210 and/or a user of the user device 210, a unique session identifier, and other information that may facilitate the selection and distribution of an ad. In one embodiment, the ad request module 238 may invoke the feature update module 230 in association with sending a request for an ad. In this way, an ad call may trigger a request for new features and subsequent execution of such features to update the capabilities of the ad application 226.

One or more additional user applications 239 may perform any number of suitable functions on the user device 210. Example user applications 239 may include, but are not limited to, a web browser or a dedicated application that may be used to view content on a web page or other information resource.

The configuration server 240 may store libraries that include features that may be used by the ad application 226 or other applications. The configuration server 240 may also include program modules in its memory 252 that may facilitate the processes described herein. For example, the memory 252 of the configuration server 240 may include a feature determination module 256, which may determine one or more libraries to send to the requesting device (e.g., the user device 210). In one embodiment, the feature determination module 256 may make such a determination based on information associated with the user device 210. Example information may include, but is not limited to, the version of the operating system used by the user device 210 and a version of the ad libraries 278 used by the ad application 226. Such information may be provided to the configuration server 240 by the feature update module 230 of the user device 210, as described above.

In one example, the feature determination module 256 may select a library that is compatible with a version of the operating system in use by the user device 210. Such a library may be the latest version of the library that is compatible with the operating system. Upon receiving an indication that the user device 210 has upgraded its operating system to a later version, the feature determination module 256 may select a newer library for installation by the user device 210. Numerous other examples exist.

In other examples, the feature determination module 256 may select features based on a user associated with a request for new features. For example, content preferences of the user, demographics of the user, prior requests by the user, and history activity of the user (e.g., the user's purchase history, browse history, search history, session history, clickstreams, etc.) may be used to determine features to send to a user. All or at least a portion of such information may be obtained from the ad server 280 or other device.

The coding device 260 may be used by an application developer to develop the ad application 226 installed at the user device 210. The coding device 260 may include a memory 272 that includes various program modules, such as an application development modules 276 and one or more ad libraries 278. The application development modules 276 may include tools for developing an application, such as a graphical user interface (GUI) for entering, debugging, and compiling program code, among other tools. A text-based interface may also be used for performing such functions in some embodiments.

The application development module 276 may also include one or more ad libraries 278. As described above, the ad libraries 278 may be used to develop the ad application 279. In one embodiment, the ad application 279 may be the same as the ad application 226 on the user device 210. According to this embodiment, user device 210 may download the ad application 226 after it is published or made available at a network-accessible location, such as the data store 270, the cloud storage 180 in FIG. 1, or other storage area.

According to one example, a developer may use an interface in the application development module 276 to call functions in the ad libraries 278 to bring the features of the ad libraries 278 into the ad application 279. In one embodiment, the ad libraries 278 may correspond to the ad functions 228 stored in the memory 222 of the user device 210.

The ad server 280 may provide ads to the user device 210, among other functions. The ad server 280 may include a memory 292, which may include an ad selection module 296. The ad selection module 296 may determine a type of ad for display by the user device 210. In one embodiment, the type of ad may be determined based on information received from the user device 210, such as an indication of one or more types of ads that the user device 210 is capable of presenting. For example, upon receiving an indication from the user device 210 that an interstitial ad is desired, the ad selection module 296 may identify and send an interstitial type of the requested ad to the user device 210.

The above descriptions in FIG. 2 are for purposes of illustration and are not meant to be limiting. Other descriptions, configurations, examples, etc., may also exist. For example, while the above descriptions relate to the user device 210 requesting new features, the configuration server 240 may send new features to the user device 210 without first receiving a request from the user device 210. The configuration server 240 may, for example, send the features upon receiving an indication that the features have been stored or otherwise made available on the configuration server 240. As another example, libraries other than those related to advertisement (e.g., the ad libraries 278 and corresponding ad functions 228) may be used to develop applications related to any number or types of processes in other embodiments.

Figure 3:
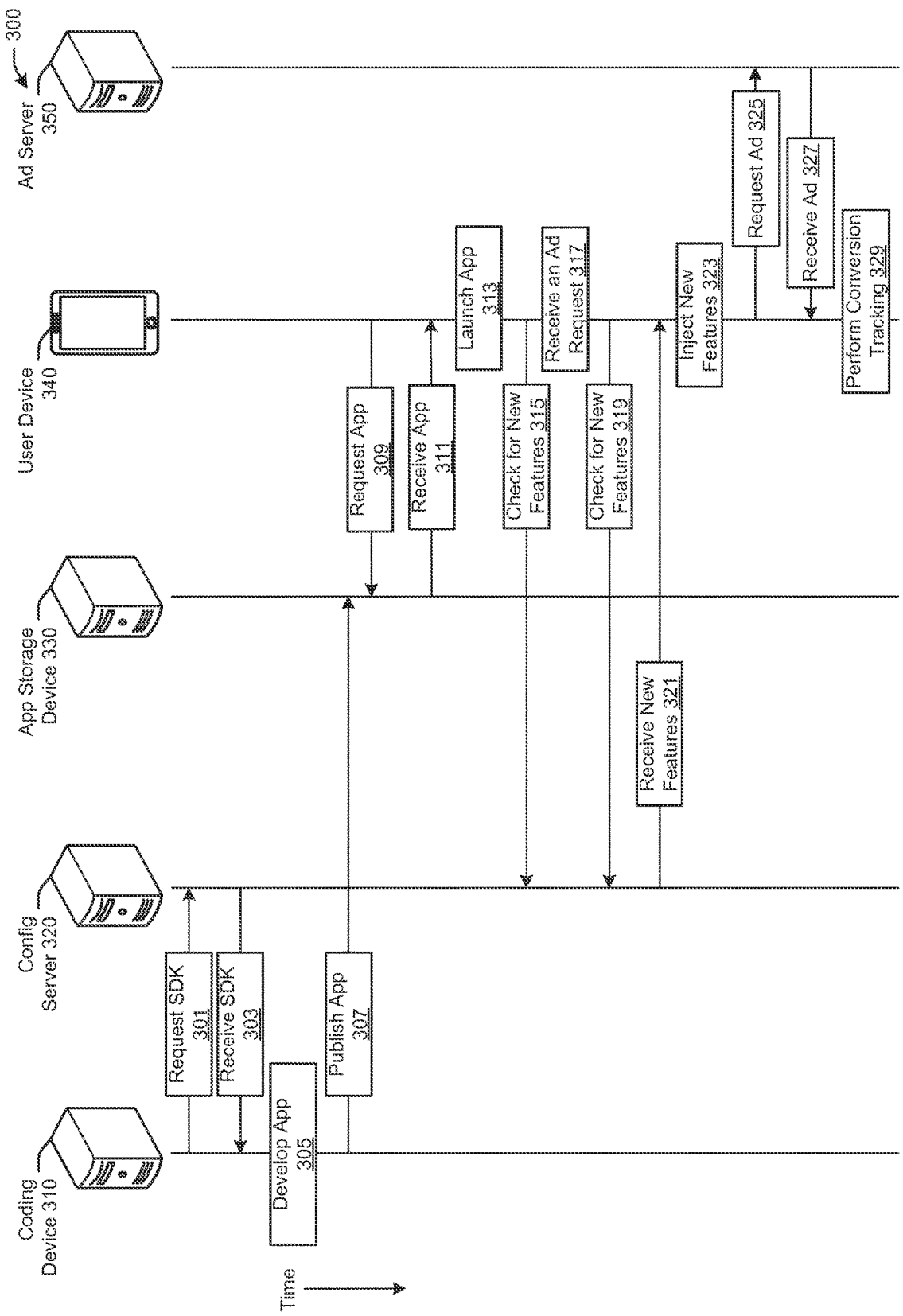
FIG. 3 illustrates a diagram for exchanging information to implement dynamic utilization of advertising capabilities by an application, according to an embodiment of the disclosure.

FIG. 3 depicts a diagram 300 for exchanging information to implement dynamic utilization of advertising capabilities by an application, according to an embodiment of the disclosure. In one embodiment, information to facilitate the processes herein may be exchanged between a coding device 310, a configuration server 320, a storage device 330, a user device 340 and an ad server 350. Each of these devices may be embodied by their corresponding devices in FIG. 2, in one embodiment.

As shown in FIG. 3, a developer may utilize a coding device 310 to request an SDK as shown in message 301. The requested SDK may be received as shown in message 303. The SDK may include one or more libraries that include functions for developing an application at the coding device 310. In certain embodiments herein, such functions may relate to advertising, such as presenting various types of ads or tracking information associated with a user's actions with respect to the ads.

An application may be developed using the features in the SDK libraries at 305. Development of the application may include generating program code by a developer and compiling the program code into binary code or another executable format, in some embodiments. In other embodiments, the generated program code may be interpreted by a suitable engine, application, or other mechanism to implement the program code.

The developed application may be published or otherwise made available by sending it to the application storage device 330, as shown in message 307. Publication of an application may include verification of the contents and functionality of the application by a third party source before the application is made available to a user of the user device 340. Put another way, the application may be approved and/or authenticated as part of a publication process.

The user device 340 may request the ad application from the app storage device 330, as shown in message 309. The user device 340 may, in response to the request, receive the requested ad application, as shown in message 311. The application may include the program code developed by the developer at 305, which may include SDK library functions as described above. In this way, the application received by the user device 340 may enable the user device to use the functions in the SDK, which in certain embodiments herein, may relate to advertising capabilities. Example advertising capabilities may include, but are not limited to, enabling the user device 340 to display certain ad types or track certain conversion information associated with user actions with respect to an ad.

The application may be installed on the user device 340, and may be subsequently launched or executed at 313. In one embodiment, launching the application may cause the user device 340 to access the configuration server 320 to determine whether additional features for the application are available, as shown in message 315. The determination may include the user device 340 sending a request for the features, in one embodiment.

The additional features may be represented by one or more libraries in an SDK that correspond to the additional features. The libraries may be stored in a particular location on the configuration server 320. In other examples, an SDK may be replaced such that it includes the previous and additional functions. In certain embodiments herein, the application launched by the user device 340 may configure the user device 340 (e.g., via the SDK functions received at 303) to access a particular location on the configuration server 320 where new libraries, SDKs, or otherwise features are stored.

In one embodiment, the user device 340 may determine whether new features exist by comparing its current features to those stored by the configuration server 320. In another embodiment, the configuration server 320 may determine whether new features are available for the user device 340. In so doing, the configuration server 320 may analyze information received from the user device 340, such as a current version of an operating system of the user device 340, a current version of the application (e.g., the ad application 172 in FIG. 1), information identifying the user device 340 and/or a user, etc. Based on the analysis and the presence of new functions, the configuration server may determine one or more library functions that are available for the user device 340. The determined library functions may be referred to herein as additional functions in the way that they may have become available after the user device 340 initially installed and launched the ad application at 313.

The user device 340 may receive a request for an ad at 317. The received request may be initiated by an application, such as the user ad application 226 in FIG. 2. Requesting an ad in such fashion may trigger or cause the user device 340 to determine whether new or additional features for the application are available, as shown in message 319. In one embodiment, such a determination may be the same or similar to the determination performed in association with the message 315 described above.

One or more additional features may be received in response to the request message 319, as shown in the message 321. The one or more additional features may be included in one or more libraries associated with an SDK, in one embodiment. Example additional features may include, but are not limited to, one or more additional ad types and conversion tracking metrics that were not previously available (e.g., at the time the user device installed the application).

The additional libraries or features may be injected into the application at 323. In so doing, the new features associated with the libraries may be made available to the application. As described above, such features may be made available without the application being re-downloaded, reinstalled, or otherwise interrupted on the user device 340, in certain embodiments herein.

The user device 340 may request one or more ads from the ad server 350, as shown in message 325. The request may include an indication of one or more ad types that the user device is capable of presenting, interacting with, or otherwise handling. Such one or more ad types may be handled by way of the SDK libraries requested at 301 and used to develop the ad application at 305. By virtue of the user device 340 downloading the ad application, the user device 340 may be configured to handle the ad types associated with the SDK libraries. Example ad types may include, but are not limited to, banner ads, interstitial ads, static ads, video ads, download ads, as well as other types and/or formats for presenting ads.

The ad server 350 may receive the indication of the one or more ad types and identify such types for the requested ad. Upon identifying the ads of the requested ad type, the ad server 350 may send the ad according to the requested type to the user device 340 (as shown in the message 327), where an SDK library configured to present the type of the ad may be invoked to present the ad at the user device 340 (e.g., via a display, a speaker, or other I/O device). The request in the message 325 may also include information associated with the user device 340 and/or a user. The ad server 350 may use such information in providing the requested ad and/or one or more additional ads to the user device 340.

The user device 340 may perform conversion tracking of certain metrics or actions associated with ads at 329. As described above, the additional features received in message 321 may configure the user device 340 to dynamically (e.g., by way of code injection as described herein) begin tracking certain metrics that were not being tracked before receipt of the new additional features associated with the message 321. In one embodiment, an additional library or code updating an existing library may configure the user device 340 to track new ad metrics. Example ad metrics that may be tracked include time of day that an ad was selected and received, time of day that a product or service associated with the ad was purchased, or any number of other actions associated with an ad.

The above descriptions in FIG. 3 are for purposes of illustration and are not meant to be limiting. For example, references to an ad application are not meant to exclude other types of applications, such as applications that are unrelated to displaying ads. Further, information in addition to that described in FIG. 3 may also be exchanges between at least a portion of the devices in FIG. 3.

Figure 4A:
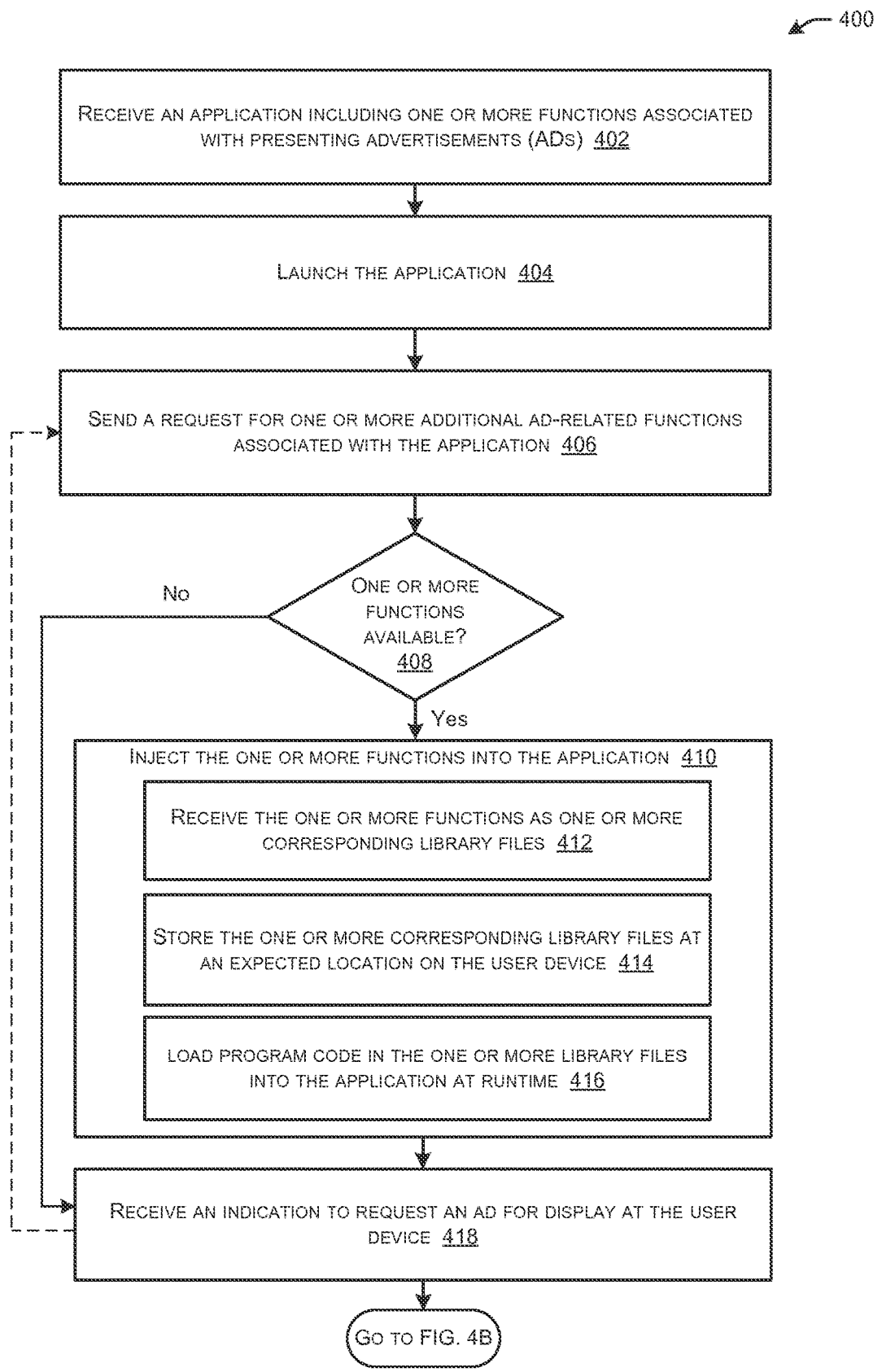
FIG. 4A illustrates a flow diagram of an example process for dynamically injecting advertising features into an application at runtime, according to an embodiment of the disclosure.

FIG. 4A depicts a flow diagram of an example process 400 for dynamically injecting advertising features into an application at runtime, according to an embodiment of the disclosure. In one embodiment, at least a portion of the example process may be implemented by a user device 210 in FIG. 2. The example process 400 may begin at block 402, where an application that includes one or more functions or features associated with advertising may be received (e.g., via the communication module 225). In one embodiment, the application may be the ad application 226 in FIG. 2, which may include ad functions 228 that corresponds to one or more libraries (e.g., ad libraries 278 in FIG. 2) that may be used to develop the application. As described above, the application may be received from a network-accessible device that may store various applications.

The application may be launched or executed at block 404. The application may be launched in response to a user selecting the application, such as by clicking on an icon on a display of the user device 210 representing the application, entering a command to start the application, etc. After the application is launched, various functions or features associated with the application may be utilized. In one embodiment, such features may be provided by the ad functions 228.

Launching the application may cause the application to request new or additional functions associated with the ad functions 226 (e.g., via the feature update module 230), in one embodiment. If one or more functions are available, at block 408, then functions may be injected into the application at block 410. Injecting the functions into the application may include receiving the functions as one or more corresponding library files at block 412. The library files may include program code to implement particular functionality (e.g., advertising related functionality) that may be used by the application launched on the user device 210.

In one embodiment, the library files may be stored in an expected location on the user device 210 (e.g., via the storage module 234) at block 414, where they may be accessed by a code injection module for dynamic loading into the application at runtime. In one example, a configuration file may be analyzed to determine a location at which to store the files (e.g., a directory, a memory location, etc.) to facilitate the code injection. The configuration file may be provided by a server (e.g., the configuration server 240 in FIG. 2), which may store the libraries and SDKs associated with the libraries. Program code in the library files may be loaded into the application at runtime (e.g., via the code injection module 236), as described above, at block 416.

Figure 4B:
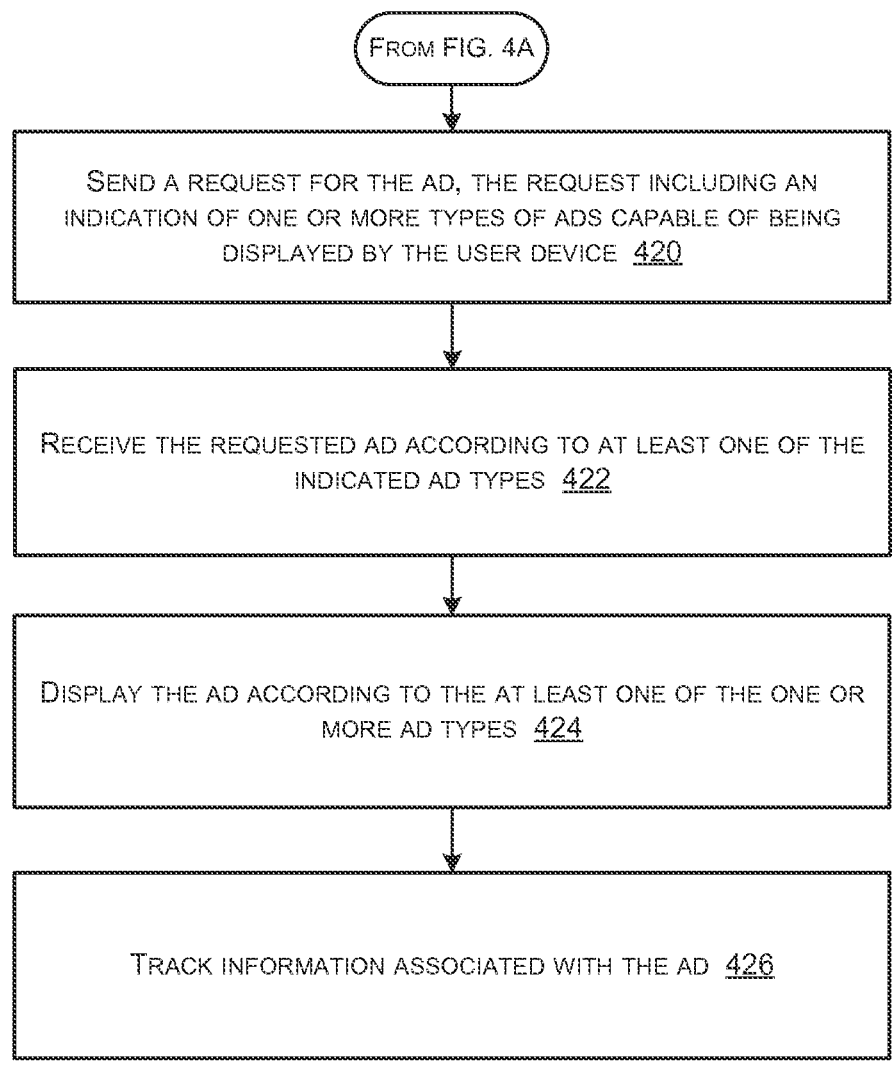
FIG. 4B illustrates a flow diagram of an example process for utilizing dynamically injected features to display ads, according to an embodiment of the disclosure.

At block 418, an indication to request an ad may be received. The indication may be initiated by an application (e.g., the user ad application 226 in FIG. 2). Receiving such an indication may trigger or cause the user device 210 to request additional ad-related functions associated with the application at block 406, as shown. If new features are identified, the new features may be injected into the application as described above. Otherwise, processing may continue to FIG. 4B, which depicts a flow diagram of an example process for utilizing dynamically injected features to display ads, according to an embodiment of the disclosure.

At block 420, a request for an ad may be sent by the user device 210 (e.g., via the ad request module 238). The request may be sent to an ad server (e.g., the ad server 280 in FIG. 2), in one embodiment. The request may include an indication of one or more ad types that are capable of being displayed by the user device 210. Such one or more ad types, and the capability to display them, may be provided by virtue of loading the functions associated with the library files into the application as described above, in one embodiment. Example ad types may include, but are not limited to, banner ads, interstitial ads, video ads, static ads, and download ads. In certain embodiments herein, one or more of these ad types may become available after launching the application by the user device 210. Such features may be dynamically injected into the application such that these features become available to the application at runtime. Along with injecting ad types at runtime, conversion tracking metrics, which may track certain actions associated with ads, may also be injected at runtime, as described above.

The requested ad may be received according to at least one of the indicated ad types at block 422. For example, the user device 210 may send an indication to an ad server that it is capable of displaying video interstitial ads. Based on the indication, the user device 210 may receive an interstitial ad of type video and display such an ad at block 424. Prior to sending the indication, and hence prior to receiving ad functions capable of displaying video interstitial ads, the user device 210 may have been capable of displaying only static interstitial ads. Numerous other examples of gaining capabilities at runtime to handle any number, type, or combination of ads exist.

Information associated with an ad, such as ad conversion metrics, may be tracked at block 426. Example metrics may include, but are not limited to, the time of day an ad was selected, the time of day a product associated with an ad was purchased, etc. Other information that may be tracked may include the time of day an application (e.g., the ad application 226) was downloaded, installed, and launched, as well as various other information associated with user actions with respect to ads or applications related to the ads.

The operations and processes described and shown above may be carried out or performed in any suitable order as desired in various implementations. Additionally, in certain implementations, at least a portion of the operations may be carried out in parallel. Furthermore, in certain implementations, less than or more than the operations described above may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable code or program instructions. Likewise, some blocks of the block diagrams and flow diagrams may not necessarily need to be performed in the order presented, or may not necessarily need to be performed at all, according to some implementations.

These computer-executable code or program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method comprising:
   receiving, by a user device comprising at least one processor, an application comprising a first function associated with causing the user device to display a first ad using a first ad format and a user interface associated with the application;
   executing, by the user device, the application, wherein the execution causes the application to send a request to a remote server for one or more additional functions associated with causing the user device to display a second ad using a second ad format and the user interface associated with the application, wherein the one or more additional functions are different than the first function, wherein the first ad format is different than the second ad format, and wherein the one or more additional functions comprise a function configured to present ads of the second ad format;
   receiving, by the user device based at least in part on the request, the one or more additional functions during runtime of the application;
   loading, by the user device, the one or more additional functions in the application during the runtime of the application, wherein the loading configures the application to perform the one or more additional functions;
   sending, by the user device to an ad server, a request for the second ad, wherein the request comprises an indication of the second ad format, and wherein the application is incapable of displaying the second ad format before loading the one or more additional functions;
   receiving, by the user device from the ad server, the second ad according to the second ad format;
   displaying, by the user device and without reinitializing the application, the second ad using at least a portion of the one or more additional functions;
   generating, by the user device, a second function comprising the first function and the one or more additional functions;
   storing, by the user device, the second function in a first storage location;
   determining, by the user device, a third function stored in a second storage location, the third function associated with causing the user device to display a third ad using a third ad format and the user interface associated with the application, wherein the first storage location is different from the second storage location;
   determining, by the user device, that the third ad format is different from the first ad format and the second ad format;
   updating, by the user device and during the runtime of the application, the second function to include the third function based at least in part on determining that the third ad format is different from the first ad format and the second ad format, wherein the updated second function is stored in the first storage location; and
   causing, based at least in part on the updated second function, the user interface to display the second ad using the third ad format.

2. The method of claim 1, further comprising:
   storing, by the user device, information associated with a tracking metric for the second ad using the one or more additional functions.

3. The method of claim 1, wherein the one or more additional functions comprise one or more first additional functions, the method further comprising:
   receiving, by the user device, an indication to request one or more additional ads; and
   sending, by the user device based at least in part on the indication to request the one or more additional ads, a request for one or more second additional functions.

4. A system comprising:
   at least one memory that stores computer-executable instructions for at least one first library function associated with causing the system to display a first ad using a first ad format and a user interface associated with an application; and
   at least one processor configured to access the at least one memory, wherein the computer-executable instructions for the at least one first library function, when executed by the at least one processor, configure the at least one processor to:
      send a request for one or more additional library functions associated with causing the system to display a second ad using a second ad format and the user interface associated with the application, wherein the one or more additional library functions are different than the at least one first library function, wherein the first ad format is different than the second ad format, and wherein the one or more additional functions comprise a function configured to present ads of the second ad format;

receive the one or more additional library functions during runtime of the application;

load the one or more additional library functions into the application during the runtime of the application, wherein the computer-executable instructions for the loading configure the at least one processor to generate a second library function comprising the at least one first library function and the one or more additional library functions, wherein the second library function configures the system to display the second ad using the user interface associated with the application, and wherein the system is incapable of displaying the second ad using the second ad format prior to loading the one or more additional library functions;

send a request for the second ad, wherein the request for the second ad comprises an indication of the second ad format;

receive the second ad according to the second ad format;

display the second ad using the one or more additional library functions without reinitializing the application;

store the second library function in a first storage location;

determine a third library function stored in a second storage location, the third library function associated with causing the system to display a third ad using a third ad format and the user interface associated with the application, wherein the first storage location is different from the second storage location;

determine that the third ad format is different from the first ad format and the second ad format;

update, during the runtime of the application, the second library function to include the third library function based at least in part on determining that the third ad format is different from the first ad format and the second ad format, wherein the updated second library function is stored in the first storage location; and cause, based at least in part on the updated second library function, the user interface to display the second ad using the third ad format.

5. The system of claim 4, wherein the first ad format comprises a static banner ad, and wherein the second ad format comprises a video banner ad.

6. The system of claim 4, wherein the first ad format comprises a static ad, and wherein the second ad format comprises a video ad.

7. The system of claim 4, wherein the at least one processor is further configured to:

store information associated with at least one first tracking metric for the first ad using the at least one first library function; and store information associated with at least one second tracking metric for the second ad using the second library function after the one or more additional library functions are loaded.

8. The system of claim 4, wherein the at least one processor is further configured to determine that the application has been launched, and wherein the request for the one or more additional library functions is sent in response to the determination.

9. The system of claim 4, wherein the at least one processor is further configured to:

receive an indication to request the second ad; and send, based at least in part on the indication, the request for the one or more additional library functions.

10. A device comprising:

at least one memory that stores computer-executable instructions for at least an initial library function associated with an application and a first tracking metric associated with a first ad, the initial library function causing the device to display the first ad using a first ad format and a user interface associated with the application; and at least one processor configured to access the at least one memory and execute the computer-executable instructions to:

send a request for at least one additional library function associated with causing the device to display a second ad using a second ad format, and the user interface associated with the application, wherein the at least one additional library function is different than the initial library function, wherein the first ad format is different than the second ad format, wherein the at least one additional library function is further associated with a second tracking metric associated with the second ad, and wherein the one or more additional functions comprise a function configured to present ads of the second ad format;

receive the at least one additional library function during runtime of the application;

load the at least one additional library function into the application during the runtime of the application, wherein the loading configures the device to generate a second library function comprising the initial library function and the at least one additional library function, wherein the second library function configures the application to at least one of: (i) display the first ad according to the first ad format and display the second ad according to the second ad format or (ii) store information associated with the first tracking metric and the second tracking metric, and wherein the device is incapable of displaying the second ad using the second ad format prior to loading the at least one additional library function, and wherein the device was not configured to implement the second ad format and the second tracking metric before loading the at least one additional library function;

display, without reinitializing the application, the second ad using at least a portion of the at least one additional library function;

store the initial library function in a first storage location;

determine a third library function stored in a second storage location, the third library function associated with causing the device to display a third ad using a third ad format and the user interface associated with the application, wherein the first storage location is different from the second storage location;

determine that the third ad format is different from the first ad format and the second ad format;

update, during the runtime of the application, the second library function to include the third library function based at least in part on determining that the third ad format is different from the first ad format and the second ad format, wherein the updated second library function is stored in the first storage location; and cause, based at least in part on the updated second library function, the user interface to display the second ad using the third ad format.

11. The device of claim 10, wherein the second library function further configures the application to: (i) display the first ad according to the first ad format and the second ad according to the second ad format, and (ii) store information associated with the first tracking metric and the second tracking metric, and wherein the second ad format and the second tracking metric were not available before loading the at least one additional library function.

12. The device of claim 10, wherein the at least one processor is further configured to access the at least one memory and execute the computer-executable instructions to:

send a request for the second ad, the request comprising an indication of the second ad format; and receive the second ad according to the second ad format.

13. The device of claim 12, wherein the at least one processor is further configured to access the at least one memory and execute the computer-executable instructions to determine that the application has been launched, and wherein the request for the at least one additional library function is sent in response to the determination.

14. The device of claim 10, wherein the at least one processor is further configured to access the at least one memory and execute the computer-executable instructions to:

send a request for the second ad, the request comprising an indication of the first ad format and the second ad format; and receive the second ad according to at least one of the first ad format or the second ad format.

15. The device of claim 10, wherein the at least one additional library function comprises at least one first additional library function, and wherein the at least one processor is further configured to access the at least one memory and execute the computer-executable instructions to:

receive an indication to request the second ad; and request, based at least in part on the indication, at least one second additional library function.

16. The device of claim 15, wherein the at least one processor is further configured to access the at least one memory and execute the computer-executable instructions to:

receive the at least one second additional library function;

select at least a portion of the at least one second additional library function; and load the selected at least a portion of the at least one second additional library function into the application during the runtime of the application.

17. The device of claim 10, wherein the first ad format comprises a static banner ad, and wherein the second ad format comprises a video banner ad.

* * * * *